(No Model.)

L. H. COLE.
NUT TAPPING MACHINE.

No. 494,367. Patented Mar. 28, 1893.

WITNESSES:
Henry J. Miller
Chas. H. Luther Jr.

INVENTOR:
Lloyd H. Cole
by Joseph A. Miller & Co.
Attys.

THE NORRIS PETERS CO., PHOTO-LITHO., WASHINGTON, D. C.

UNITED STATES PATENT OFFICE.

LLOYD H. COLE, OF PAWTUCKET, RHODE ISLAND.

NUT-TAPPING MACHINE.

SPECIFICATION forming part of Letters Patent No. 494,367, dated March 28, 1893.

Application filed March 23, 1892. Serial No. 426,044. (No model.)

*To all whom it may concern:*

Be it known that I, LLOYD H. COLE, of Pawtucket, in the county of Providence and State of Rhode Island, have invented certain new and useful Improvements in Nut-Tapping Machines; and I hereby declare that the following is a full, clear, and exact description of the same, reference being had to the accompanying drawings, forming part of this specification.

The invention has reference to improvements in automatic nut-tapping machines.

The objects of the invention are to produce a nut-tapping machine which will automatically present, in succession, a number of nuts to the tap, automatically release the nuts from the holding jaws after tapping, and push them on to the shank of the tap.

The further object of the invention is to produce a nut-tapping machine which will be automatically stopped when the desired number of nuts have been tapped, and which can be conveniently and readily started.

The invention consists in certain peculiar features of construction and novel combination of parts which will hereinafter be more fully described and pointed out in the claims.

Figure 1:
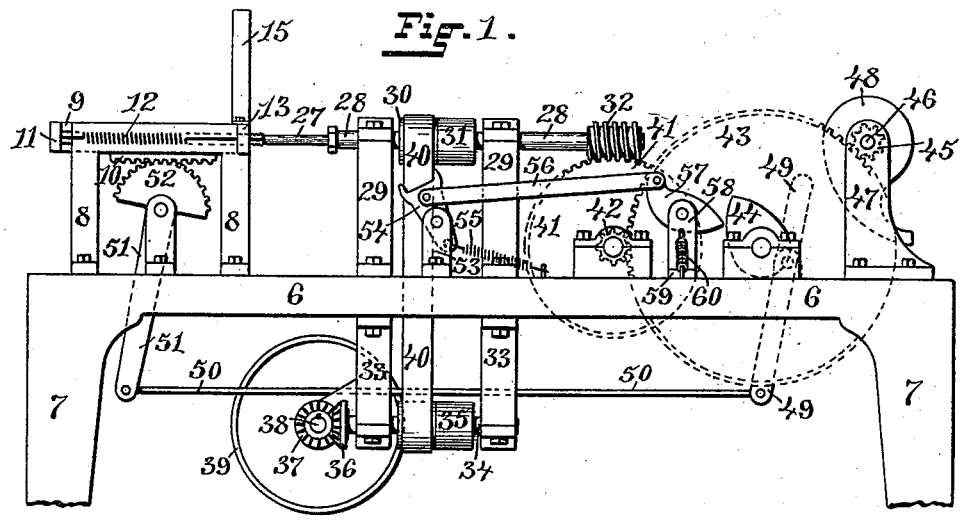
Figure 2:
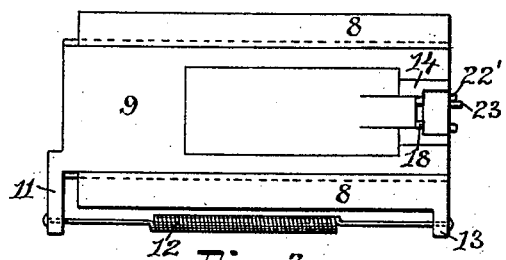
Figure 4:
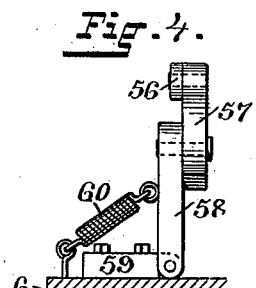
Figure 3:
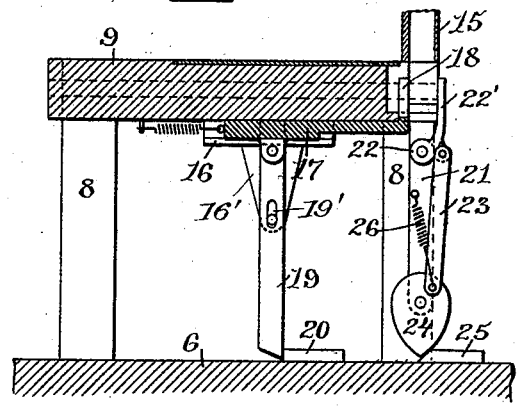
Figure 5:
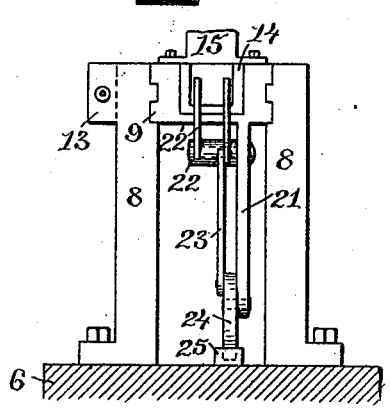

Figure 1 is a front elevation of the improved nut-tapping machine, indicating the operation of the same. Fig. 2 represents a top view of the sliding table for presenting the nuts to the tap, and the frame in which said table is supported. Fig. 3 represents a longitudinal sectional view of the same. Fig. 4 represents a side view of the rocking support to which the shipper-controlling cam is journaled. Fig. 5 represents a front view of the movable table, showing the interchangeable jaws for holding the nuts while being tapped, and the mechanism for holding said nuts from falling out while being brought forward, together with means for depressing such mechanism to allow the nuts to be released from said jaws after being tapped.

Similar numbers of reference designate corresponding parts throughout.

In the drawings 6 indicates a substantial bed-plate which is suitably supported, by the legs 7—7, or otherwise; secured to one end of this bed-plate is the frame 8 supporting the longitudinally movable table 9, which is held in slides in the upper portion thereof. This table is furnished on its lower surface with a rack 10, and has an arm 11 extending from the rear portion to which is secured one end of the spring 12, the other end being secured to the stud 13 on said frame 8 and tending to continually advance the table 9.

Secured in a central slot formed in the forward end of the table 9 is a jaw-block 14, changeable at will to correspond with the size of the nuts to be tapped, and which are contained in the delivery or feed-box 15 supported over the opening in said jaw-block. The lower surface of the table 9 is also provided with slides 16 in which moves the spring-operated bar 17, having the upwardly-extending fingers 18; and depending from the table is an arm or bracket 16' to the lower end of which the lever 19 is pivoted, the pivot on the end of the bracket 16' entering the vertical slot 19' in the lever 19, the upper end of this lever being pivoted to the bar 17, and the lower end being adapted to be engaged by the stop 20 secured to the bed-plate, so that by this engagement the bar 17 and fingers are advanced more rapidly than the table, and, having a longer throw than the table 9, tend to push the tapped nut out of the jaws.

Depending from the forward portion of the table 9 is a rigid arm 21, to the upper portion of which is secured a short shaft on which is a sleeve 22, carrying the fingers 22', adapted to hold the nut in the jaws of the block 14, and eccentrically pivoted to this sleeve is a connecting-rod 23, also eccentrically pivoted at its lower end to the rotatable cam 24 carried on the lower end of the arm 21, which is operated by striking the stop 25 to depress said fingers 22', while the spring 26 tends to draw this cam back into place when the table recedes.

The tap 27 is removably secured to the shaft 28 and is driven thereby. This shaft is journaled in the brackets 29 secured to the bed-plate, and is held in axial alignment with the center of a nut held between the jaws of the block 14. Intermediate these brackets 29 the shaft is provided with a pulley 30 secured thereto, and a loose pulley 31 independently rotatable thereon, and the rear end of this shaft is extended considerably beyond its journaled portion and is provided with the worm-gear 32.

Immediately below the brackets 29 and depending from the bed-plate 6 are the brackets 33, in which is journaled a shaft 34 carrying the pulleys 35 secured thereto; this shaft has also the small beveled gear 36, which intermeshes with a beveled gear 37 on the shaft 38, journaled in bearings at right angles from the shaft 34 and driven by a belt working over the pulley 39.

By changing the size of the gear 37 the speed at which the shaft 34 is driven can be varied. When in operation the fast pulley 30 is driven by the belt 40 which passes over the pulley 35.

The worm-gear 32 intermeshes with the gear 41 which is carried by a shaft journaled in bearings supported on the bed-plate 6, and also secured to this shaft is a pinion gear 42, which intermeshes with the gear 43 carried by a shaft also journaled in bearings secured to said bed-plate, and to this last mentioned shaft is secured the cam 44, which is rotated thereby, the difference in size between the gear 43 and the pinion 42 corresponding to the number of nuts to be tapped before the machine is stopped for the removal of said nuts.

Driven by the engagement of its teeth with those of the large gear 43 is a pinion 45, carried by the shaft 46, which is journaled in the brackets 47 secured to the bed-plate,—this shaft 46 also carrying the large cam 48 which makes one complete revolution for each nut that is tapped.

As the large cam 48 revolves, its rounded surface is brought to bear against the upper end of the lever 49, which is pivoted in a slot in the bed-plate; the forcing forward of the upper end of this lever throws the lower end backward, and, this end being connected by the rod 50 with the lower end of the lever 51, also draws this end of the lever 51 in the same direction, and rocks the upper pivoted end of the same, to which is secured the semi-circular pinion 52, which engages the rack 10 on the sliding-table 9 and forces the same backward against the force of the spring 12 until released by the end of the cam 48 moving past the upper end of the lever 49, when the spring 12 again acts to draw the table forward and to present a new nut to the action of the tap. As the carriage 9 is moved forward by the spring 12, the nut-blank is held between the fingers 18 and 22' and is prevented from turning by the sides of the jaw-block 14 in the forward end of the table and, in this position, is acted upon by the cutting-portion of the tap which passes through the nut until, when the table is in the position shown in Fig. 3, the cutting-portion of the tap has passed beyond the nut and the lever 19 striking the stop 20 is swung on its pivot and throws the bar 17 forward at a greater speed than that at which the table is moving. The fingers 18 being formed in part with the bar 17 are advanced with it and force the nut on to the shank of the tap, the nut being released by the depression of the fingers 22' through the medium of the cam 24 striking the stop 25 and the connecting-rod 23 pivoted to the sleeve carrying the fingers 22' and to the upper portion of the cam 24.

Intermediate the brackets 29 is secured, to the bed-plate, a stud 53, to the upper end of which is pivoted the belt-shipper 54, the lower end of which is drawn by the spring 55 in a direction to tend to keep the belt 40 in the position shown in Fig. 1 of the drawings, while to the upper portion of this shipper is pivoted the shipper-rod 56, pivoted at the other end to the shipping-cam 57, which is journaled on a shaft secured to the rocking-arm 58, this arm being pivoted to the block 59 secured to the bed, and supported in an upright position by the spring 60 fastened to the rocking-arm, and to a screw-eye secured to the bed-plate. As the cam 44 is revolved by the rotation of the shaft on which it is secured, it strikes the end of the shipper-cam 57 and throws the same downward, thus drawing the shipper 54 through the medium of the shipper-rod, and removing the belt on to the loose pulley 31. As the belt 40 leaves the fast pulley the mechanism is stopped, and the shipper is held by the cams 44 and 57 against the action of the spring 55; the tap 27 carrying the finished nuts on its shank may now be taken from the machine and the nuts slipped off. When the tap has been replaced, a slight backward pressure on the rocking-arm 58 will throw the cam 57 back of the cam 44 and allow the spring 55 to act to throw the shipper, and thus move the belt 40 back on to the tight pulley 30.

Having thus described my invention, I claim as new and desire to secure by Letters Patent—

1. In a nut-tapping machine having a longitudinally rotatable tap and means for driving the same, the combination with the table 9, movably supported by the frame 8 in front of said tap, and having the arm 11, a spring 12 secured to said arm and to the stud 13 on the forward end of said frame, a feed-box 15 secured to the central forward portion of said table, a jaw-block 14 secured in a slot in said table below said box, the spring-operated bar 17, carrying the fingers supported in the slide 16 on the lower surface of said table, and operated against the spring pressure by the rod 19 pivoted to said bar 17 and to a depending arm on said table, and adapted to be engaged by the stop 20, and a rack 10 secured to the under side of the table, of the lever 51 pivoted between studs below said table and having the semi-circular pinion 52 engaging with said rack 10, a rod 50 connecting the lower end of the lever 51 with that of the pivoted lever 49, a cam 48 carried by the shaft 46 journaled in suitable bearings, and means for operating said cam to throw the lever 49, as described.

2. In a nut-tapping machine, the combination with a longitudinally movable table 9, provided with a jaw-block 14 and having a depending-arm 21 carrying a shaft, of a sleeve 22 journaled on said shaft and having the fingers 22', a cam 24 pivoted on the lower end of said arm 21, a rod 23 eccentrically pivoted to the cam 24 and to the sleeve 22, and a stop 25 adapted to engage said cam to operate the same, as described.

In witness whereof I have hereunto set my hand.

LLOYD H. COLE.

Witnesses:
HENRY J. MILLER,
JOSEPH A. MILLER, Jr.